United States Patent
Raghothaman (10) Patent No.: US 6,745,009 B2
(45) Date of Patent: Jun. 1, 2004

(54) APPARATUS, AND ASSOCIATED METHOD, FOR FACILITATING ANTENNA WEIGHT SELECTION UTILIZING DETERMINISTIC PERTURBATION GRADIENT APPROXIMATION

(75) Inventor: Balaji Raghothaman, Allen, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/146,159

(22) Filed: May 15, 2002

(65) Prior Publication Data
US 2003/0215006 A1 Nov. 20, 2003

(51) Int. Cl.[7] .................................................. H04K 3/00
(52) U.S. Cl. ........................................................ 455/63
(58) Field of Search ................................ 455/562.1, 69, 455/561, 63.4, 67.11, 272, 276.1, 436; 342/368, 372

(56) References Cited

U.S. PATENT DOCUMENTS 5,656,929 A * 8/1997 Humpherys .................. 324/95
6,492,942 B1 * 12/2002 Kezys ......................... 342/368

* cited by examiner

Primary Examiner—Vivian Chin
Assistant Examiner—Yuwen Pan (57) ABSTRACT

Apparatus, and an associated method, for facilitating selection of optimal antenna weightings by which to weight signals sent in a communication system that utilizes closed-loop transmit diversity. A deterministic perturbation gradient approximation technique is utilized in which perturbation vectors are selected by a selector and applied, by an applicator, to antenna weighting elements. A selected set of perturbation vectors are applied to the antenna weighting elements in both a positive direction and a negative direction. A detector at a receiving station measures in disassociated with the signals communicated thereto, once weighted with the perturbation vectors. A single-bit feedback value is returned to the sending station, and the antenna weightings are appropriately adjusted.

20 Claims, 3 Drawing Sheets

APPARATUS, AND ASSOCIATED METHOD, FOR FACILITATING ANTENNA WEIGHT SELECTION UTILIZING DETERMINISTIC PERTURBATION GRADIENT APPROXIMATION

The present invention relates generally to a manner by which to select antenna-weightings at a sending station that utilizes transmit diversity. More particularly, the present invention relates to apparatus, and an associated method, by which to utilize a perturbation gradient approximation technique in the selection of the antenna weightings. Improved antenna-weighting selection accuracy is provided as a long-term covariance matrix of a channel upon which a communication signal is sent is tracked, instead of merely tracking a short-term fading process. And, the amount of feedback needed in the effectuation of the antenna-weight selection is independent of the number of transmit antennas utilized by the sending station.

BACKGROUND OF THE INVENTION

Communication of information is an endemic necessity of modem society. Communication of information is effectuated through operation of a communication system. Information is communicated between a sending station and a receiving station by way of a communication channel. The sending station, if necessary, converts the information into a form to permit its communication upon the communication channels. And, the receiving station, if necessary, operates upon detected indications of the information to permit operations to be performed thereupon to recover the information.

A wide variety of different types of communication systems have been developed and are regularly utilized to effectuate communication of information between sending and receiving stations. New types of communication systems have been, and continue to be, developed and constructed as a result of advancements in communication technologies.

An exemplary communication system is a radio communication system. In a radio communication system, the communication channel is defined upon a radio link extending between the sending and receiving stations. Communication systems implemented as radio communication systems are sometimes of reduced costs, relative to wire line counterparts. And, radio communication systems are amenable to implementation as mobile communication systems since radio links, rather than fixed, wire line connections, are utilized upon which to define communication channels used to communicate the information.

A cellular communication system is exemplary of a radio communication system that has achieved significant levels of usage. Cellular communication systems have been installed throughout significant parts of the populated portions of the world. Various cellular communication standards have been promulgated, setting forth the operational parameters of different types of cellular communication systems.

Generally, a cellular communication system includes a fixed network infrastructure that includes a plurality of fixed-site base transceiver stations. The fixed-site base transceiver stations are positioned at spaced-apart locations throughout a geographical area that is to be encompassed by the communication system. Each of the base transceiver stations defines an area, referred to as a cell, from which the cellular communication system derives its name.

The fixed network infrastructure of which the base transceiver stations form portions is coupled to a core network, such as a packet data backbone or public-switched, telephonic network. Communication devices, such as computer servers, telephonic stations, etc. are, in turn, coupled to the core network, or elsewhere, and are capable of communication by way of the network infrastructure and the core network.

Portable transceivers, referred to as mobile stations, communicate with the base stations by way of radio links forming portions of the electromagnetic spectrum. Use of the cellular communication system is permitted, typically, pursuant to a service subscription, and users, referred to as subscribers, communicate by way of the cellular communication system through utilization of the mobile stations.

Information communicated upon a radio link is susceptible to distortion as a result of non-ideal communication conditions. Other communication systems are analogously non-ideal, and communication of information in such other communication systems analogously also is susceptible to distortion. The distortion causes values of the information delivered to a receiving station to differ with the corresponding values of the information, when transmitted by the sending station. If the distortion is significant, the informational content of the information cannot be accurately recovered at the receiving station.

Fading caused by multi-path transmission distorts information communicated upon a communication channel. If the communication channel exhibits significant levels of fading, the informational content of the information might not be able to be recovered.

Various techniques are utilized to compensate for, or otherwise overcome, the distortion introduced upon the information during its communication upon a communication channel to the receiving station. Space diversity, for instance, is sometimes utilized. Space diversity is created through the use, at a sending station, of more than one transmit antenna transducer from which information is transmitted. Spacial redundancy is provided therefrom. The antenna transducers are typically separated by distances great enough to ensure that the information communicated by respective antenna transducers fades in an uncorrelated manner. And, receiving stations sometimes also utilize more than one receive antenna transducer, also typically separated by appropriate separation distances.

Communication systems that utilize both multiple transmitting antenna transducers and multiple receive antenna transducers are sometimes referred to as being MIMO (Multiple-Input, Multiple-Output) systems. Communications in an MIMO system provide the possibility that higher overall capacity of the system, relative to conventional systems can be achieved. Increased number of users are able to be serviced, or more data throughput is capable of being provided for each user.

The advantages provided through the use of space diversity are further enhanced if the sending station is provided with information about the state of the interface, interfacing the sending and receiving stations, i.e., the communication channel.

A sending station is not able to measure channel characteristics of the communication channel directly. Such measurements are possible only at a receiving station. In two-way communication systems, measurements made at the receiving station can be returned to the sending station to provide an indication to the sending station of the channel characteristics.

Communication systems that provide this type of information to a multiple-antenna sending station are referred to as being systems that provide closed loop transmit diversity. Communication channels extending from the network infrastructure of a cellular communication system to a mobile station are sometimes referred to as being down link, or forward link, channels. And, channels extending from the mobile station back to the network infrastructure are sometimes referred to as being uplink, or reverse link, channels.

The feedback information returned to the sending station, here at the network infrastructure, from the receiving station, here a mobile station, is used to select values of antenna weightings. The weightings are weighting values by which information signals provided to separate ones of the antenna transducers are weighted prior to their communication upon a communication channel to the mobile station. A goal is to weight the information signals applied to the antenna transducers in manners best to facilitate communication of the information to the receiving station. The values of the antennas weightings approach a conjugate of the subspace spanned by down-link channel covariance matrix. Estimation of the antenna weightings can be formulated as a transmission subspace tracking procedure. Several closed loop transmit diversity procedures are utilized. TxAA, Eigenbeam Former, and other techniques are sometimes utilized. Existing techniques, however, suffer from various deficiencies. For instance, a TxAA procedure fails to take into account a long-term covariance matrix of the communication channel in the selection of the antenna weightings. And, use of an Eigenbeam former technique is dependent upon the number of antenna transducers of the sending station. When the number of antenna transducers increases, the complexity of such a technique increases rapidly.

What is needed, therefore, is an improved manner by which to implement closed-loop transmit diversity, thereby to permit improved communications in a MIMO, or other, communication system.

It is in light of this background information related to radio communication systems that utilize space diversity that the significant improvements of the present invention have evolved.

SUMMARY OF THE INVENTION

The present invention, accordingly, advantageously provides a manner by which to utilize a perturbation gradient approximation technique in the selection of antenna weightings at a sending station that utilizes transmit diversity.

During operation of an embodiment of the present invention, apparatus, and an associated method, is provided by which to select the antenna-weightings at the sending station that utilizes transmit diversity.

Improved antenna-weighting is provided. The procedure automatically adjusts to the rapidity of fading. In slow fading, the short term fading process is tracked. In fast fading, where other methods still unsuccessfully try to track the short term fading, this procedure tracks the long term covariance matrix of the communication channel. The amount of feedback needed for effectuation of the antenna weighting selection is independent of the number of transmit antennas utilized by the sending station. Also, a user-specific pilot signal is not needed for operation. So, the method, and apparatus, is implementable in any of many different types of high data-rate systems, not merely systems that utilize a user-specific pilot signal.

In one aspect of the present invention, a deterministic perturbation gradient approximation procedure is carried out to facilitate the antenna weighting values to be utilized at a sending station that utilizes space diversity. The approximation technique facilitates optimization of the selection of the antenna weighting values, thereby to optimize the communications between a sending station and a receiving station. A perturbation vector is selected at the sending station for communication upon the communication channel to the receiving station. The perturbation vector is selected in a selected order, selected from a selected set of vectors. The vectors are each formed of vector values. The antenna weightings of the antenna transducers of the sending station are perturbed in a first manner during a first portion of a time period and in a second manner during a second portion of a time period. When the time period forms a time slot of a designated time length, during a first half of the time slot, the antennas weightings are perturbed by the perturbation vector in a positive direction. And, during a second half of the time slot, the perturbation vector is applied to the antenna weightings to perturb the weightings in a negative direction.

In another aspect of the present invention, the receiving station that receives the information communicated by the sending station upon the communication channel measures power levels of received signals containing the information communicated by the sending station. Separate power level measurements are made during the first half and the second half of the time slot. Differences between the power levels measured during the separate halves of the time slot are determined. And, an indication of the values of the calculated differences are returned to the sending station.

And, in another aspect of the present invention, the sending station detects delivery of the indications of the values of the calculated differences made at the receiving station and utilizes such indications to adjust the antenna weightings by which subsequently to weight information signals that are sent by the sending station to the receiving station.

In one implementation, the deterministic perturbation gradient approximation technique is utilized in a cellular communication system having a base transceiver station that utilizes space diversity. Closed loop transmit diversity is provided to optimize selection of antenna weightings by which to weight down link signals that are communicated to the mobile station by the base transceiver station. Perturbation vectors are applied to the antenna weighting elements in positive and negative directions during separate portions of a time period. Weighted signals are sent by the base transceiver station to the mobile station and are detected thereat. The mobile station measures power levels of the signals detected thereat during the first and second portions of a time slot and returns values of differences in the power levels measured during the first and second portions of the time slot to the base transceiver station. The values returned to the base transceiver station are used to adjust the antenna weightings at the base transceiver station. Closed-loop transmit diversity is thereby provided. Because deterministic perturbation gradient approximation techniques are utilized, a long-term covariance matrix is tracked and utilized upon which to select the antenna weightings. And, the antenna weighting selection is independent of the number of transmit antennas utilized by the base transceiver station, or other sending station.

In these and other aspects, therefore, apparatus, and an associated method, is provided for a communication system having a first communication station and a second communication station. The first communication station communicates a communication signal to the second communication station. The communication signal is weighted at a first weighting element of the first communication station by a first weighting element of the first communication station by a first antenna weight. And, the communication signal is weighted at least at a second weighting element of the first communication station with at least a second antenna weight. Optimization of selection of the first and at least second antenna weights is facilitated. A perturbation vector selector is coupled to the first communication station. The perturbation vector selector selects at least a first set of perturbation vector values to form at least a first selected perturbation vector. A perturbation vector applicator is coupled to the perturbation vector selector. The perturbation vector applicator applies the perturbation values forming the at least the first selected perturbation vector to the first and at least second weighting elements. The perturbation values applied to the first and at least second weighting elements are at least in part determinative of the first and at least second antenna weights.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
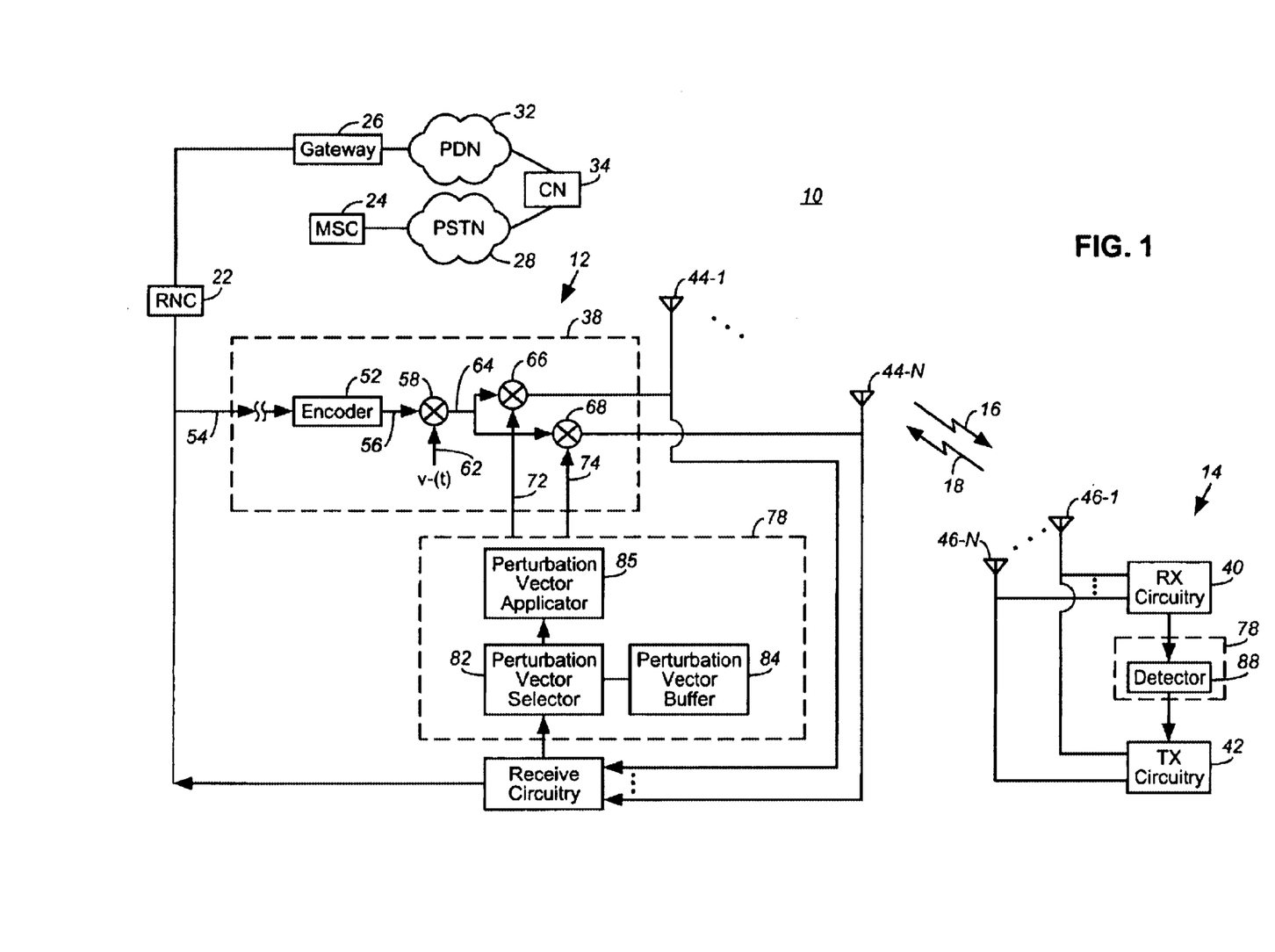
FIG. 1 illustrates a functional block diagram of a communication system in which an embodiment of the present invention is operable to facilitate selection of optimal antenna weightings by which to weight signals communicated during operation of the communication system.

Referring first to FIG. 1, a radio communication system, shown generally at 10, provides for 2-way radio communications between two separately-positioned communication stations interconnected by way of radio channels. Here, a first of the communication stations forms a base transceiver station (BTS) 12 of a cellular communication system. And, the second of the communication stations forms a mobile station 14, also operable in a cellular communication system.

The radio communication channels are defined upon radio links, here forward-link channels 16 and reverse-link channels 18. Information sent to the mobile station is communicated by the base transceiver station upon the forward-link channels 16. And, information originated at the mobile station 14 for communication to the base transceiver station is communicated upon reverse link channels 18.

The communication system 10 is exemplary of a cellular communication system constructed pursuant to any of several different cellular-communication standards. For instance, the base transceiver station and mobile station are exemplary of devices operable in a CDMA (Code-Division, Multiple-Access) communication scheme, such as a 3G-CDMA (third generation, CDMA) communication standard. Operation of an embodiment of the present invention is, of course, analogously also operable in other types of cellular communication systems as well as other types of communication systems in which closed-loop transmit diversity, can advantageously be utilized.

The base transceiver station forms part of a radio access network that also includes a radio network controller (RNC) 22. And, the radio network controller, in turn, is coupled to a mobile switching center (MSC) 24 and a gateway (GWY) 26. The mobile switching center and gateway also form portions of the radio access network.

The mobile switching center is coupled to a public-switched telephonic network (PSTN) 28. And, the gateway is coupled to a packet data network (PDN) 32, such as the internet backbone. A correspondent node (CN) 34 is shown to be coupled to the packet data network and to the PSTN. The correspondent node is exemplary of a data source or a data destination from which, or to which, information is routed during operation of the communication system.

The base transceiver station 12 includes both a receive part, represented by the receive circuitry 36, and a transmit part, represented by transmit circuitry 38. A forward link signal to be communicated by the base transceiver station to the mobile station is converted into a form to permit its communication upon a forward link channels 16 by the transmit circuitry. And, closed-loop feedback information is returned by the mobile station to the base transceiver station by way of a reverse link channel 18.

The mobile station 14 also includes a receive portion, represented by the receive circuitry 40 and a transmit part, represented by the transmit circuitry 42. The receive circuitry operates to receive, and operate upon, forward-link signals transmitted by the base transceiver station upon forward-link channels 16. And, the transmit circuitry 42 operates to transmit reverse-link signals upon reverse-link channels 18 to the base transceiver station.

Here, both the base transceiver station and the mobile station include the multiple antenna transducers, and the base transceiver station-mobile station combination forms an MIMO (multiple-input, multiple-output) system. The base transceiver station includes N antenna transducers 44-1 through 44-N. And, the mobile station includes M antenna transducers, antenna transducers 46-1 through 46-M. The antenna transducers 44 and 46 are, here, coupled to both of the transmit and receive circuitries of the base transceiver station and mobile station, respectively.

The transmit circuitry 38 includes an encoder 52 that encodes data provided thereto by way of the line 54 to form encoded data on the line 56. The line 56 is coupled to a first input terminal of an up-mixer 58 and, an up-mixing signal v(t), is applied to a second input terminal of the up-mixer by way of the line 62. An up-mixed signal is generated on the line 64.

The line 64 includes separate branches for applying the up-mixed signal to the separate antenna transducers 44. Weighting elements 66 and 68 are positioned in-line in the separate branches of the line 64. That is to say, a branch of the line 64 is coupled to an input terminal of the weighting element 66, and a second branch of the line 64 is coupled to an input terminal of the weighting element 68. Lines 72 and 74 are also coupled to the antenna elements 66 and 68, respectively. Values generated on the lines 72 and 74 are determinative of the weightings applied to the up-mixed signals. Once the signals are weighted, the signals are applied to the antenna transducers to be transduced thereat. Additional up-mixing, and other, operations are performed upon the weighted signals prior to application to the antenna transducers.

The base transceiver station further includes apparatus 78 of an embodiment of the present invention. The apparatus 78 adjusts the values of the weightings generated on the lines 72 and 74 and applied to the weighting elements 66 and 68, respectively, in manners that facilitate optimal antenna weighting selection pursuant to a closed loop transmit diversity scheme of an embodiment of the present invention. The elements forming the apparatus are functionally represented and are implementable in any desired manner, such as by algorithms executable by processing circuitry. The apparatus includes a perturbation vector selector 82 that operates to select perturbation vectors formed of vector values retrieved from a perturbation vector buffer 84. The perturbation vectors selected by the selector 82 are provided to a perturbation vector applicator 84 applies the perturbation vector to the antenna weighting elements 66 and 68 in selected manners. The perturbation vectors perturb the weightings of the antenna weighting elements and, in turn, the values of the signals transduced by the antenna transducers 44. Forward-link signals generated on the forward-link channels 16, weighted with the perturbation vectors are delivered to the mobile station 14. Signals detected by the antenna transducers 46 are transduced into electrical form, provided to the receive circuitry 40 and operated upon thereat.

The mobile station also includes apparatus 78 of an embodiment of the present invention. The apparatus 78 positioned at the mobile station includes a detector 88 that operates to detect, and measure, indications of the perturbations of the power levels of the signal generated by the base transceiver station and communicated on the forward-link channels 16. Here, indications of the power levels of the signals are measured, and indications thereof are provided to the transmit circuitry for transmission back to the base transceiver station. Once returned to the base transceiver station, indications of the detections made by the detector are used to adjust the subsequent antenna weightings by which the weighting elements 66 and 68 to weight the signals applied thereto.

The apparatus 78 operates to provide a deterministic perturbation gradient approximation that provides tracking of long-term feedback. The deterministic perturbation gradient approximation technique utilized by the apparatus 78 of an embodiment of the present invention builds upon stochastic perturbation gradient approximations (SPGAs). Optimization techniques sometimes utilize a procedure referred to as gradient descent.

One of the most important methods used in optimization literature is known as gradient descent. It involves adaptively converging to a point in a vector space, corresponding to the global minimum (or maximum) of a cost function defined on the space. At each iteration of the adaptation, an estimate of the gradient of the cost function is formed, and the estimate of the optimal vector is revised such that it moves in the direction of the gradient vector. This process can be visualized in three dimensions involving a 2-D vector space, as moving closer to the bottom of the cost-function bowl at each iteration.

The most widely used gradient search technique is the stochastic gradient search, which is applied in the Least Mean Squares (LMS) algorithm for adaptive finite impulse response (FIR) filtering. One of the features of adaptive time domain FIR filtering is that, in most such problem formulations, an input stochastic vector process is acting upon the filter, which is of the same dimensionality as the filter, and can thus be used to estimate the cost function gradient vector.

In certain other situations, like neural network learning, it is necessary to use other methods for arriving at the gradient vector. One such method is called the simultaneous stochastic perturbation gradient approximation technique, in which, at each iteration, the effect of a stochastic perturbation on the cost function is studied, and based on this effect, the estimate of the optimal vector is moved toward or away from the direction of the perturbation vector.

The stochastic perturbation technique mentioned above has been applied to the problem of transmission subspace tracking for closed loop transmit diversity and MIMO. In order for this SPGA technique to be possible, dedicated pilots are used, which carry the perturbed weights based on which the cost function is estimated. The dedicated pilots are also used to coherently demodulate the received signal, since the average of the dedicated pilot over two slots provides the weighted composite channel estimate necessary for coherent demodulation. In many proposals for high-speed packet access wireless system, though, there is no provision at all for dedicated pilot channels. Hence existing SPGA technique cannot be implemented in such situations where there is no user-specific pilot.

Another disadvantage of the existing SPGA technique is that the dedicated pilots are usually transmitted with the same power as the traffic signal, which is quite low when compared to the user-non-specific antenna pilots, henceforth referred to as common pilots. This fact leads to a degraduation in the channel estimate and hence the performance of the link as such.

A possible method for increasing the reliability of the channel estimate is to use a combination of the channel estimates from the common pilots along with an estimate of the weights applied at the transmitter. These weights can, in fact be known to the mobile station if the same set of random perturbation vectors applied at the transmitter can be replicated at the mobile receiver. This involves operating a complex random number generator at both the base station and the mobile station in a synchronized manner. The complexity and synchronization issues make this an undesirable alternative.

Use of the deterministic perturbation gradient approximation technique of an embodiment of the present invention tackles both the issues mentioned above. Firstly, a deterministic perturbation is proposed, which makes it unnecessary to operate two synchronized random vector generators. Secondly, a method of extracting the cost function from the traffic signal itself is proposed, rendering a user-specific pilot unnecessary.

The aim of the algorithm is to estimate the optimal antenna weights w for transmission. Let $H_{pk}=[h_{plk} \ldots h_{plk}]_{M \times L}^3$, where $h_{plk}$ is a M-length vector representing the fading channel coefficients at time k, from the M-antenna transmitter to the $p^{th}$ antenna of a receiver with N antennas, with L paths from each transmit antenna to each receive antenna. The received signal power is given by $P_r = w^H R_k w$, where $$R_k = \sum_{p=0}^{N-1} \sum_{l=0}^{L-1} h_{plk} h_{plk}^H$$

is the channel covariance matrix.

The optimal weights in order to maximize the received signal power are given by $$w = \arg\max_w \frac{w^H R_k w}{w^H w}. \quad \text{equation 1}$$

The solution to this optimization is given by:

$W_k = u_o$, where $R_k = U\Lambda U^H$, $U = [u_0 \ldots u_{M-1}]$, $\Lambda = \text{diag}(\lambda_o, \lambda_1, \ldots, \lambda_{M-1})$, $$\Lambda = \text{diag}(\lambda_o \geq \lambda_1 \ldots, \lambda_{M-1}), \quad \text{equation 2}$$

In (2), $u_0$ is referred to as the principal eigenvector, or alternately the principal component of $R_k$. If the time-averaged estimate of the covariance matrix $$\hat{R}_k = \sum_{n=k-T}^{k} R_n$$

is used for the optimization, then the weights track the long-term covariance of the channel. The cost function to be maximized is given from (1) as:

$$J_k = \frac{w_k^H \hat{R}_k w_k}{w_k^H w_k} \quad \text{equation 3}$$

and it can be shown that the gradient of this cost function with respect to the vector $w_k$ is given by the first order approximation of the Taylor series expansion as $$g_k = \frac{\partial J_k}{\partial w_k} = \frac{2\hat{R}_k w_k}{w_k^H w_k} \quad \text{equation 4}$$

The adaptation of the weight vector itself is given by the iteration $$W_{k+1} = w_k + \mu g \quad \text{equation 5}$$

From equation 4, it is clear that an estimate of the gradient can be formed at the receiver. In many cases, the adaptation has to take place at the receiver. But here, the adaptation has to take place at the transmitter. It is not practical to feedback the entire M×1 gradient vector over the reverse link.

The perturbation algorithm is a method of providing an approximation to the gradient of the cost function to the transmitter with minimal feedback. Over two consecutive time periods, the current weight vector is perturbed as $W_e = W_k - \beta \Delta W_k$ $$W_o = W_k - \beta \Delta W_k \quad \text{equation 6}$$

The effect of the perturbation is studied at the receiver as $$c = \frac{w_e^H \hat{R}_k w_e}{w_e^H w_e} - \frac{w_o^H \hat{R}_k w_o}{w_o^H w_o} \quad \text{equation 7}$$

Note that c is a real scalar quantity. Note also that the covariance matrix, is assumed to be constant over the period in which the perturbations are performed. In the stochastic perturbation technique, it is known that, when the perturbation is composed of randomly generated complex vectors, the quantity $E[c\Delta w_k]$, where $E[.]$ refers to the expectation operator, is a vector proportional to the true gradient vector $g_k$. Furthermore, it is sufficient to have only the quantity sgn(c) instead of c. This is because sgn(c) can be visualized a highly quantized form of c, with 1-bit quantization. Hence sgn(c)=c+γ, where γ is the quantization noise, usually assumed to be uncorrelated with the statistics of c.

A primary idea is to use a set or predetermined vectors for the perturbation, and cycle through them. The test of whether a state of vectors from a complete perturbation set for our purposes is that the condition $$E_{\Delta w}[c\Delta w] = +\propto g_k, \quad \text{equation 8}$$

be satisfied, as in the case of stochastic perturbation.

Firstly, it is intuitively clear that any set of perturbation vectors $\Delta w \in (\delta w_1, \delta w_2, \ldots, \delta w_k)$ must be such that, any arbitrary M-dimensional complex vector can be expressed as $$x + jy = \sum_i a_k \delta w_i, \quad \text{equation 9}$$

$w_i \in R$

This condition is necessary because of the fact that the iterative solution of the weights is a linear sum of the perturbation vectors with real scale factors, and it is essential that this sum be able to represent any point in the vector space.

Let $Q_M = [q_0, q_1, \ldots, q_{M-1}]$ be an orthonormal set of M-length vectors. Then, it can be proved that the set $$\tilde{Q}_M = [Q_M \; jQ_M] \quad \text{equation 10}$$

forms a complete perturbation set.

It is known that any arbitrary complex vector X can be represented as a linear sum of the vectors from $Q_M$, i.e., there exist $\alpha_i (= \alpha_{real.i} + j\alpha_{imag.i})$, $i = 0, \ldots, M-1$, such that $$X = \sum_i a_i q_i \quad \text{equation 11}$$

But the above linear sum can be rewritten as $$X = \sum_i \alpha_{real.i} q_i + \sum_i j\alpha_{imag.i} q_i \quad \text{equation 12}$$

$$= \sum_i \alpha_{real.i} q_i + \sum_i \alpha_{imag.i} (jq_i)$$

Hence any arbitrary vector in the complex space can be represented as a linear sum of vectors in $\tilde{Q}_M$ using real coefficients.

Next we have to establish that $\tilde{Q}_M$ satisfies the condition in (8).

$$c\Delta w = \frac{w_e^H \hat{R}_k w_e}{w_e^H w_e} - \frac{w_o^H \hat{R}_k w_o}{w_o^H w_o} \Delta w \quad \text{equation 13}$$

$$= \frac{(w_k + \beta \Delta w)^H \hat{R}_k (w_k + \beta \Delta w)}{(w_k + \beta \Delta w)^H (w_k + \beta \Delta w)} -$$

$$\frac{(w_k - \beta \Delta w)^H \hat{R}_k (w_k - \beta \Delta w)}{(w_k - \beta \Delta w)^H (w_k - \beta \Delta w)} \Delta w$$

Assuming that the denominators can be equated as $$c\Delta w \frac{2\beta}{\|w_k\|^2}(w_k^H \hat{R}_k \Delta w + \Delta w^H \hat{R}_k w_k) \Delta w \qquad \text{equation 14}$$

Using the approximation of the gradient from (4), the above can be rewritten as $$c\Delta w = 2\beta(g_k^H \Delta w + w^H g_k)\Delta w \qquad \text{equation 15}$$

The vector $\Delta w$ takes on values equal to any column of $\tilde{Q}_M = [Q_M \; jQ_M]$ with equal probability $$\frac{1}{2M}.$$

Hence, $$E[c\Delta w] = \frac{\beta}{M}\left[\sum_i (g_k^H q_i + q_i^H g_k) q_i\right] + \frac{\beta}{M}\left[\sum_i (g_k^H jq_i + jq_i^H g_k) jq_i\right]$$

$$= \frac{\beta}{M}\left[2\sum_i (q_i^H g_k) q_i\right]$$

$$= \frac{2\beta}{M} Q_M Q_M^H g_k$$

$$= \frac{2\beta}{M} g_k$$

Since by definition we have $Q_M Q_M^H = I_M$.

Thus, any orthonormal set of vectors can be used to form a perturbation set for transmission subspace tracking. Some examples of orthonormal sets are the set of Discrete Fourier Transform (DFT) vectors, or the Discrete Cosine Transform (DCT) vectors.

The convergence of the DPGA method can be shown to be similar to that of the stochastic perturbation approach. The randomness of the perturbation has been stated as an essential condition for convergence. One of the considerations seems to be that a deterministic perturbation will lead to a biased estimate. Another is that only a random perturbation will lead to guaranteed convergence to the global minimum. From this point of view, the iterative algorithm will be trapped in a local minimum only in the condition that the cost function surface is flat in all the directions pertaining to each of the perturbation vectors, at that local minimum. The probability of such an occurrence is probably small, especially in a time varying fading channel environment.

The quantity $g_1$ from (7) must be obtained at the mobile receiver. One method is to transmit a pilot signal weighted with the perturbed weights. This pilot will be specific to the user, and hence requires additional power allocated to the user. Note that the traffic signal itself will be weighted with the weight vector that was obtained by adaptation at the previous iteration, i.e., $w_k$, while the dedicated pilot will e weighted with $w_k + \beta \Delta w$] and $w_k - \beta \Delta w$] in succession.

An alternative approach, used in an exemplary implementation, is to use the traffic channel itself to obtain the cost function. Suppose that at each instant, the traffic signal is weighted using the perturbed weights. Consider the received traffic signal at antenna p, after dispreading, when the perturbed weight $w_e = w_k + \beta \Delta w$] is used, when the transmitted symbol is s:

$$r_p = w_e^H H_p s + n, \qquad \text{equation 17}$$

ignoring the time subscripts. An estimate of the quantity $w_e^H \hat{R}_k w_e$ can be found simply as $$\frac{1}{|s|^2} \sum_p r_p r_p.$$

The term for the energy of the transmitted symbol becomes expendable when using constant modulus schemes like QPSK, 8PSK, but it has to be taken into account multi-level schemes like 16-QAM. Similarly, the perturbed vector $w_e = w_k - \beta \Delta w$ is used on the traffic channel in the next time internal, and the quantity $w_o^H \hat{R}_k w_o$ is estimated. Thus, the quantity sgn(c) can be estimated from (7). The only disadvantage of the usage of the traffic channel itself to aid the adaptation as described above, is that the actual weights applied are always perturbed from the values dictated by the adaptation. That is to say, the weights as prescribed by the adaptation algorithm are $w_k$, but the actual weights used are Equation 16

$w_e$ or $w_o$. But since $\beta$ is a small quantity, the effect of this perturbation on the performance of the algorithm is insignificant.

Figure 2:
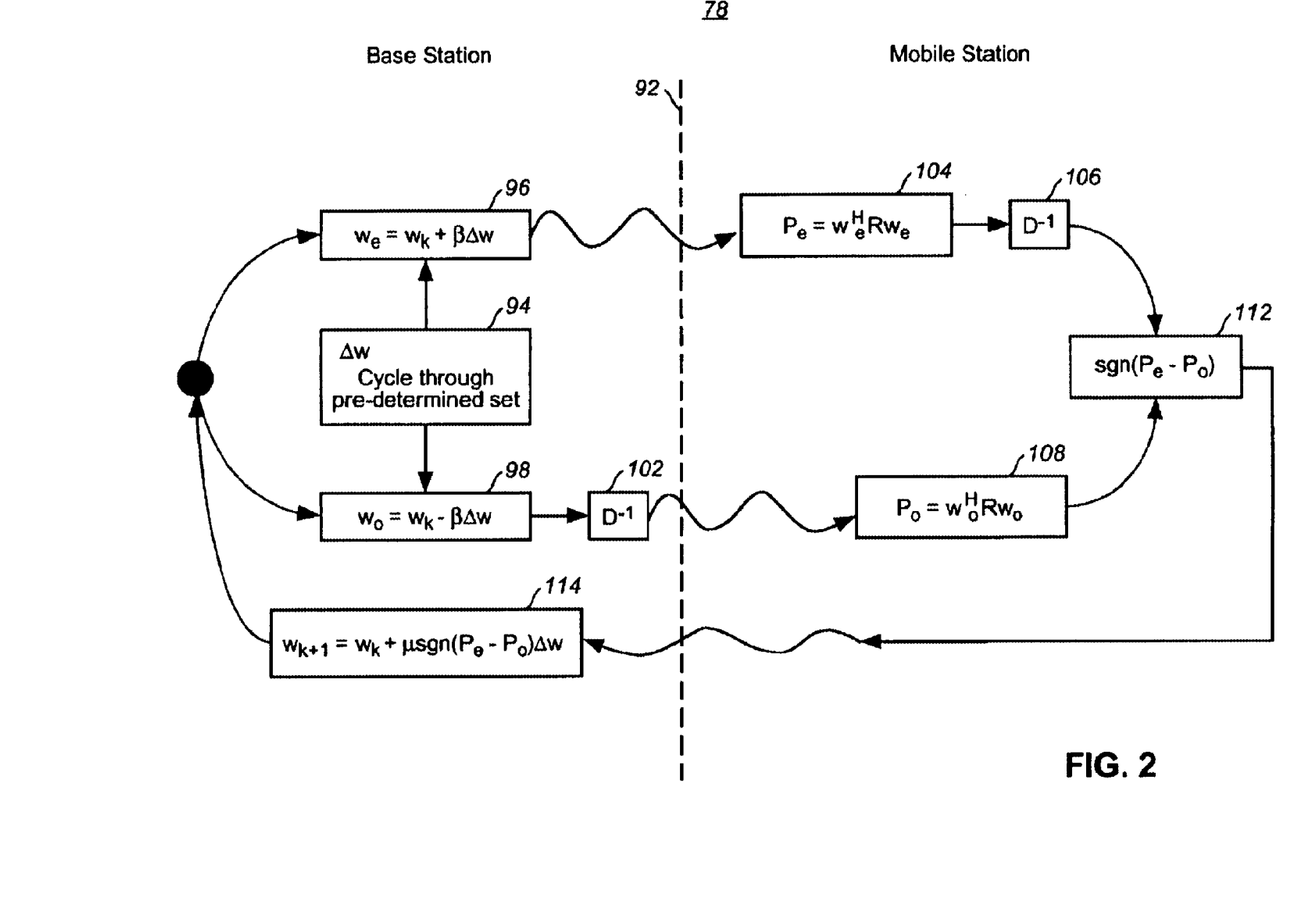
FIG. 2 illustrates a representation of the deterministic perturbation gradient approximation technique utilized during operation of an embodiment of the present invention.

FIG. 2 illustrates the apparatus 78, showing exemplary operation thereof to optimize the antenna weightings of the weighting element to optimize communications on the forward link to the mobile station.

Elements in the figure shown at the left-side (as shown) of the line 92 are representative of operations performed at the base transceiver station. And, functions shown at the right-side (as shown) of the line 92 are performed at the mobile station 14. Initially, the weighting values of the antenna weightings, represented by a weight vector, is initialized to a zero value, or a small complex vector quantity known to the mobile station as well as the base transceiver station. Then, as indicated by the function 94, a perturbation vector is selected in a pre-determined order from a predetermined set of vectors at a time-slot k.

During a first half of the time slot k, the transmit weights are perturbed in a positive direction to generate $w_e$ and forward-link, traffic-channel are weighted through the perturbed weights before being transduced by the antenna transducers 44. Such operations are represented by the function 96.

And, during a second half of the time slot k, the transmit weights are perturbed in the negative direction to generate $w_o$, and forward-link traffic-channel signals are weighted through the perturbed weights before being transduced by the antenna transducers 44. Such operations are indicated by the function 98. And, the values are delayed, indicated by the operator $D^{-1}$ indicated by the block 102.

At the mobile station, the apparatus 78 operates to measure the power levels of the receive signal during both halves of the time slot k. As indicated by the function 104, during the first half of the time slot, the received power $P_e$ is obtained after correcting for the amplitudes of the modulated transmit symbols. And, such value is operated upon by the operator $D^{-1}$ indicated by the function 106. During the second half of the time slot k, the receive power $P_o$ is obtained, indicated by the function 108. Then, a difference therebetween is determined and a single bit representation thereof is determined, indicated by the function 112, and returned as feedback to the base transceiver station.

Once the feedback is detected at the base transceiver station, and the antenna weightings are updated, indicated by the function 114, for the subsequent time slot k+1.

Successive iterations are performed during successive time slots. And, analogous operations can be performed at the mobile station with feedback returned thereby by the base transceiver station.

Figure 3:
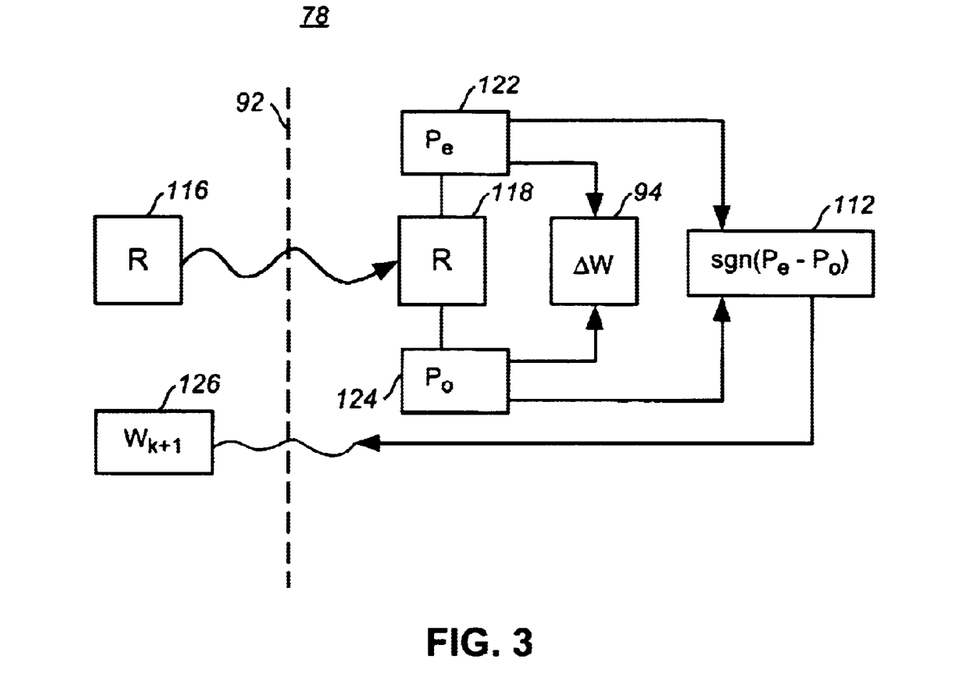
FIG. 3 illustrates a representation, similar to that shown in FIG. 2, of the deterministic perturbation gradient approximation technique utilized during operation of another embodiment of the present invention.

FIG. 3 illustrates the apparatus 78, showing exemplary operation of another embodiment of the present invention by which to facilitate selection of the weighting values applied to the weighting elements of a sending station to optimize communications on the forward link to the mobile station.

In this implementation, the delays, represented by the functions 102 and 106, associated with operation of the embodiment shown in FIG. 2 are obviated as, here, the perturbations are performed at the mobile station.

Again, elements in the figure shown at the left-side (as shown) of the line 92, are representative of operations performed at the base transceiver station. And, again, functions shown at the right-side (as shown) of the line 92 are performed at the mobile station 14.

The function 116 represents the generation of pilot signals by the base transceiver station for communication to mobile stations, such as the mobile station 14. And, the function 118 at the mobile station is representative, as described herein, formation of values of the vectors R. Indications of the values generated by the function R are provided to the functions $P_e$ and $P_o$ 122 and 124.

The functions 122 and 124 are also coupled to the function 94, here positioned at the mobile station. The function 94 is maintained in synchronization with a corresponding function 94 maintained at the base transceiver station. The function 94 is representative of selection of a perturbation vector, selected in a pre-determined order from a predetermined set of vectors at time-slot k.

The functions 122 and 124 are provided to a difference function 112 that operates to determine a single-bit representation of the differences between the values determined at the functions 122 and 124, respectively. The difference is returned to the base transceiver station and used to adjust the weighting values, indicated by the block 126, by which the weighting values of the antenna weightings are weighted.

Figure 4:
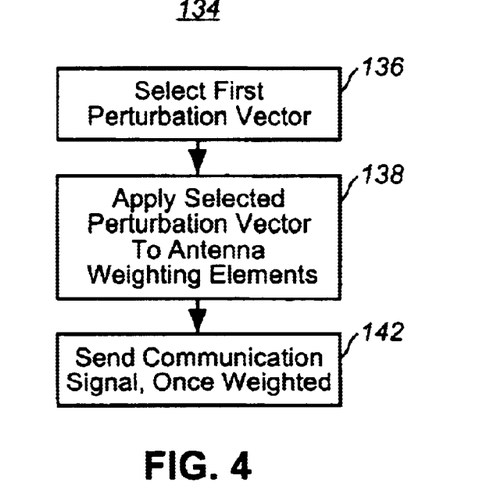
FIG. 4 illustrates a method flow diagram listing the method of operation of an embodiment of the present invention.

FIG. 4 illustrates a method, shown generally at 134 representative of the method of operation of an embodiment of the present invention. The method facilitates optimization of selection of antenna weights by which to weight signals generated in a radio communication system that utilizes closed-loop transmit diversity.

First, and as indicated by the block 136, at least a first selected perturbation selector formed of perturbation values is selected. Then, and as indicated by the block 138, the at least the first selected perturbation vector, is applied to the antenna weighting elements of a sending station. Then, and as indicated by the block 142, the communication signal, once weighted by the first and at least second antenna weights, is sent to the second communication station.

Thereby, through operation of an embodiment of the present invention, a manner is provided by which to utilize a single-bit feedback value to select the antenna weightings that the antenna weighting elements weight send signals. Improved accuracy is provided as a long-term covariance matrix is utilized instead of merely tracking a short-term fading process. And, the amount of feedback needed to effectuate the selection of the antenna weightings is independent of the number of transmit antennas utilized by the sending station.

The previous descriptions are of preferred examples for implementing the invention, and the scope of the invention should not necessarily be limited by this description. The scope of the present invention is defined by the following claims:

What is claimed is:

1. In a communication system that utilizes closed-loop transmit diversity and has a first communication station and a second communication station, the first communication station for transmitting a communication signal to the second communication station, the communication signal weighted at a first weighting element associated with the fist transmit antenna of the communication station by a first antenna weight and the communication signal weighted at least at a second weighting element associated with the at least the second transmit antenna of the first communication station with at least a second antenna weight, an improvement of apparatus for facilitating optimization of selection of the first and at least second antenna weights, respectively by, which best to facilitate transmission of the communication signal said apparatus comprising:

a perturbation vector selector coupled to the first communication station, said perturbation vector selector for selecting at least set of perturbation vector values to form at least a first selected perturbation vector; and a perturbation vector applicator coupled to said perturbation vector selector, said perturbation vector applicator for selecting application of applying the perturbation values forming the at least the first selected perturbation vector to the first and at least second weighting elements associated with the first and at least second transmit antennas, the perturbation values applied to the first and at last second weighting elements at least in part determinative of the first and at least second antenna weights and the communication signal weighted by the first and at least second antenna weights transmitted pursuant to the closed-loop transmit diversity.

2. The apparatus of claim 1 further comprising a perturbation vector buffer accessible by said perturbation vector selector, said perturbation vector buffer for buffering the at least the first set of perturbation vector values available for selection by said perturbation vector selector.

3. The apparatus of claim 2 wherein said perturbation vector buffer buffers a plurality of perturbation vectors, each formed of sets of perturbation vector values.

4. The apparatus of claim 3 wherein the at least the first selected perturbation vector formed of the at least the first set of perturbation vector values is selected by said perturbation vector selector from amongst the plurality of perturbation vectors buffered at said perturbation vector buffer.

5. The apparatus of claim 4 wherein said perturbation vector selector selects a sequence of perturbation vectors, the sequence selected according to a selected order.

6. The apparatus of claim 1 wherein said perturbation vector applicator applies at least the first selected perturbation vector to the first and at least second weighting elements in a first manner during a first portion of a selected time period.

7. The apparatus of claim 6 wherein said perturbation vector applicator applies at least the first selected perturbation vector to the first and at least second weighting elements in a second manner during a second portion of the selected time period.

8. The apparatus of claim 7 wherein the first manner by which said perturbation vector applies the at least the first selected perturbation vector is in a positive direction and wherein the second manner by which said perturbation vector applies the at least the first selected perturbation vector is in a negative direction.

9. The apparatus of claim 7 wherein the communication system defines time slots of selected time lengths and wherein the selected time period during which the at least the first selected perturbation vector is applied by said perturbation vector applicator comprises a time slot.

10. The apparatus of claim 9 wherein the first portion and the second portion of the time slot during which said perturbation vector applicator applies the at least the first perturbation vector comprise substantially equal portions of the time slot.

11. The apparatus of claim 1 wherein the communication system comprises a multiple-input, multiple-output (MIMO) radio communication system having a fixed network part of which the first communication station forms a portion and wherein said perturbation vector selector and said perturbation vector applicator are embodied at the fixed network part.

12. In the communication system of claim 7 a further improvement of apparatus for the second communication station, further for facilitating optimization of selection of the first and at least second antenna weights, said apparatus comprising:
a detector coupled to the second communication station, said detector for detecting indicia associated with the communication signal, weighted by the first antenna weight and the at least the second antenna weight, once transmitted to the second communication station.

13. The apparatus of claim 12 wherein the indicia detected by said detector comprises energy-level selected indicia detected during the selected time period.

14. The apparatus of claim 13 wherein said detector further determines a difference between the energy-level related indicia detected during the first portion and the energy-level related indicia detected during the second portion.

15. The apparatus of claim 14 wherein said detector forms a single-bit representation of the difference.

16. The apparatus of claim 14 further comprising a feedback generator coupled to said detector to receive a value representative of the difference determined thereat, said feedback generator for generating a feedback indication signal representative of the difference, said feedback indication signal for communication back to the first communication station.

17. The apparatus of claim 16 further comprising a feedback detector positioned at the first communication station, aid feedback detector for detecting the feedback indication signal once communicated back to the first communication station and for indicating effectuation of updating of weighting applied to the communication signal by the first antenna weight and the second antenna weight.

18. In a method for communicating in a communication system that utilizes closed loop transmit diversity and has a first communication station and a second communication station, the first communication station for transmitting a communication signal to the second communication station, the communication signal weighted at a first weighting elements associated with a first transmit antenna of the first communication station by a first antenna weight and the communication signal weighted at least at second weighting element associated with a second transmit antenna of the first communication station with at least a second antenna weight, an improvement of a method for facilitating optimization of situation of the first and at least second antenna weights, respectively, by which best to facilitate transmission of the communication signal said method comprising:
selecting at least a first selected perturbation vector formed of perturbation values;
applying the perturbation values forming the at least the first selected perturbation vector to the first and at least second antenna weighting elements, the perturbation values applied to the first and least second weighting element at least in part determinative of the first and at least second antenna weights; and
sending the communication signal, once weighted by the first and at least second antenna weights, to the second communication station, the communication signal sent pursuant to the closed loop transmit diversity.

19. The method of claim 18 further comprising the operations of:
detecting the communication signal sent to the second communication signal;
determining indicia associated with the communication signal; and
returning a feedback indicia to the first communication station responsive to determinations made during said operation of determining.

20. The method of claim 19 wherein said operation of applying comprises applying the at least the first perturbation vector in a first manner during a first selected time period and applying the at least the first perturbation vector in a second manner during a second selected time period and wherein said operation of determining comprises detecting differences between the communication signal detected during the selected time period and the second selected time period.

* * * * *